Figure 1:
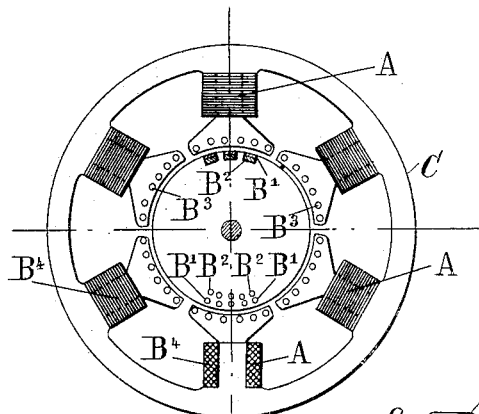

(No Model.)

A. BLONDEL & G. SAUTTER.
CONVERTER FOR MONOPHASE CURRENTS.

No. 596,567. Patented Jan. 4, 1898.

Witnesses.
Reeve Lewis
H. R. Edelin

Inventors.
André Blondel
Gaston Sautter
by Pollok & Mauro
their attorneys.

UNITED STATES PATENT OFFICE.

ANDRÉ BLONDEL AND GASTON SAUTTER, OF PARIS, FRANCE.

CONVERTER FOR MONOPHASE CURRENTS.

SPECIFICATION forming part of Letters Patent No. 596,567, dated January 4, 1898.

Application filed June 27, 1895. Serial No. 554,250. (No model.)

*To all whom it may concern:*

Be it known that we, ANDRÉ BLONDEL and GASTON SAUTTER, citizens of France, residing at Paris, France, have invented certain new and useful Improvements in Converters for Monophase Currents; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

There are now existing a number of systems for converting alternating polyphase into continuous currents. All these systems are based upon the production of a rotating field by means of a polyphase current, which itself is utilized to produce a continuous current in an armature-winding provided with a collector; but thus far no analogous system has been proposed for the conversion of the ordinary alternating current—that is to say, monophase current—into a continuous current. The difficulty which is experienced when it is attempted to produce this transformation in apparatus analogous to those used for polyphase current arises from the fact that the ordinary alternating current produces in the armature an alternating and not a rotary field. This alternating field causes sparks at the brushes so soon as attempt is made to supply a considerable alternating current to the armature, and it is this difficulty which has heretofore prevented the realization industrially of apparatus based on the above-mentioned principle.

By the present invention the difficulty is overcome in the following manner: An alternating field in a fixed armature is equivalent, as theory and experience show, to two fields, one direct, the other retrograde, turning in opposite directions, both with a velocity equal to that which the armature would have in synchronous rotation. When the armature turns in synchronous rotation, the retrograde field becomes fixed in space, while the direct field continues to turn in the same direction as the armature, but with double the velocity. If now it is possible once the armature is in synchronous rotation to eliminate by some means the direct-rotating field, there will remain only the retrograde field, which has become fixed in space. Thus there will have been obtained with an ordinary alternating field a field which is fixed and which consequently allows the production of a continuous current; or, as the theory may be otherwise stated, the alternating magnetic flux or reversal of direction of the magnetic lines of force may be regarded as equivalent to two rotary fluxes having opposite directions. The principle of the present invention is based upon the suppression of one of these components, resulting in the production of a continuous current.

It has been already stated that when an armature revolves in a field produced by an ordinary alternating current and when the apparatus is not provided with a tertiary winding sparks are produced at the brushes, these sparks being caused by the inducing-field produced by the primary circuit, the field not being constant, as in continuous-current machines, but alternating. Each section of the secondary circuit is traversed by the magnetic flux at the moment it is short-circuited by the brushes, because at this moment its plane is approximately perpendicular to the lines of force. The section therefore becomes the seat of a very intense induced current, as in the secondary circuit of a transformer closed on itself. When the brushes leave the corresponding contacts of each section, the short-circuit thereof is broken and the sudden suppression of the induced current referred to produces the spark.

The explanation of the action of the tertiary winding in preventing sparking is that such winding has the effect of producing, by the action of the induced current in this winding, a second magnetic field. The combination of these two magnetic fields produces a constant field fixed in space. The secondary winding revolving in the magnetic field which has become constant will be found to be in the same condition as the windings of the armature of a continuous-current dynamo. It is possible, therefore, to find, as in ordinary dynamos, a position for the brushes in which no sparks will be produced. The arrangement based upon this principle, which has never heretofore been employed for the conversion of simple alternating currents, is represented in the accompanying drawings, in which—

Figure 5:
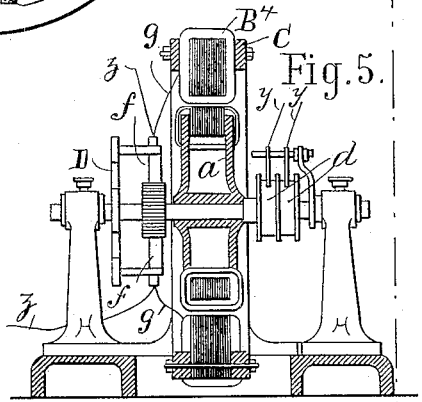

Figures 1, 2, 3, and 4 illustrate in side elevation different arrangements of apparatus constructed in accordance with the invention, and Fig. 5 is a vertical section of an entire machine.

In all the apparatus constructed according to our invention the armature has a primary winding to which the primary (monophase alternating) current is delivered, and a secondary winding which collects the transformed current and delivers it by suitable brushes. This armature is surrounded by a closed, or nearly closed, magnetic frame, which carries a tertiary winding with closed coils whose function is to neutralize, suppress, or counteract one component of the alternating current set up in the secondary coil, and which also carries, or may carry, a quarternary winding for an exciting-current. As will be obvious, these elements of the apparatus may be arranged in various ways within the principle of the invention.

Figure 3:
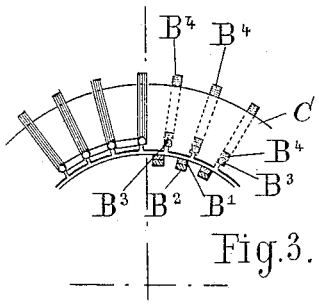
Figure 2:
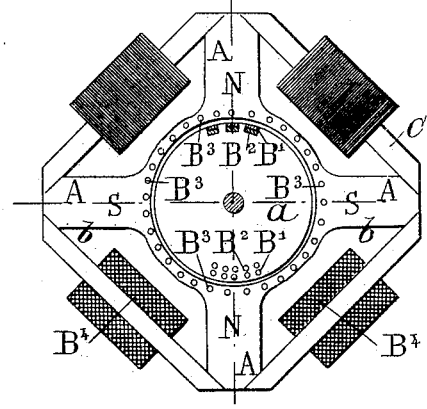
Figure 4:
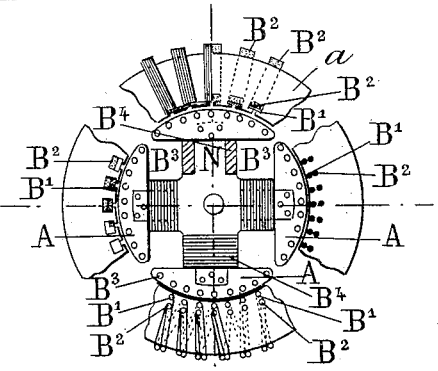

The rotating armature $a$ of our converter is provided with two windings $B'$ $B^2$, Figs. 1, 3, and 4. The winding $B'$ or the primary is traversed by the simple alternating current. The winding $B^2$ or the secondary delivers the continuous current by means of a suitable commutator. The armature is surrounded by a magnetic frame C, which itself is provided with a winding $B^4$, which we call the "quarternary" winding for an ordinary continuous exciting-current. This winding may be disposed of in a discontinuous manner upon projecting poles A, as indicated in Figs. 1 and 2, or it may be distributed in a continuous manner on a ring formed of superposed sheets of iron, as shown in Fig. 3. When the quarternary winding is discontinuous and on projecting poles, the extremities or extensions $b$ of the pole-pieces A envelop the armature almost completely, as shown in Fig. 1, forming a nearly-closed magnetic circuit either of solid or of laminated construction. The pole-pieces may, however, be formed, as shown in Fig. 2, of plates connected together and completely surrounding the armature, forming a completely-closed magnetic circuit. To these continuous plates the form illustrated in Fig. 1 or any other suitable form may be given.

Such apparatus as we have described differs in form from continuous-current machines in which the pole-pieces are always disconnected or from synchronous motors, these two classes of machines not being provided with an iron circuit around the armature almost or entirely continuous.

What chiefly distinguishes this apparatus from the two classes of machines referred to is the use of a particular winding, which we call the "tertiary" winding and which is formed of bars or coils of copper $B^3$, arranged in the extremities or extensions of the pole-pieces when the apparatus is constructed as shown in Figs. 1 and 2, or in the grooves of the continuous breech of soft iron in Fig. 3. This winding is formed of coils united in closed rings, as common in the polyphase and asynchronous motors, or they are united so as to form distinct circuits, with two or three phases terminating at the rheostats, so as to reduce the intensity in starting, as is done in asynchronous motors. The function of this tertiary winding is, however, very different from that of the winding in asynchronous polyphase motors. Its object, in fact, is to eliminate one of the two rotary fields composing the ordinary alternating field produced by the primary circuit.

When the armature is in motion, it turns with a velocity synchronous with the movement which feeds it. The retrograde rotating field which forms one of two components of the alternating field is then fixed in space. The other rotating field has a space or velocity double that of the synchronous velocity. It is precisely this field which the induced currents that are developed in the tertiary circuit eliminate completely, provided the bars of the tertiary are of sufficient section. It hence results, once the apparatus is in motion, that the alternating field produced by the primary circuit is transformed into a field fixed in space. Such field can then be utilized for generating in the secondary winding a continuous current, as in an ordinary dynamo.

Fig. 4 represents a somewhat different arrangement of the apparatus. The armature is made stationary and is placed outside the frame. It is formed of a series of iron plates placed together and provided with two primary and secondary windings $B'$ and $B^2$, arranged in holes or in grooves. The movable frame turns within the armature and carries this quarternary winding $B^4$ (in which the continuous current flows) and the closed-coil tertiary winding $B^3$. The principle of current production is exactly the same as in the first arrangement.

In Fig. 5 a complete machine is represented. On one side are the two rings for the supply of the monophase primary-current commutator, whose brushes take off the current generated on the secondary.

In reference to the quarternary winding $B^4$, in which the continuous current flows, it is to be observed that in the new or improved system the exciting-field can be produced without the aid of a quarternary winding solely by the magnetization due to the primary current itself, as in an induction-transformer; but this latter arrangement is attended by expenditure of current, which is naturally taken up in the network, and it is preferable to place on the machine an exciting quarternary winding, (shown at $B^4$ on the drawings,) which may be supplied with current by a branch derived from the brushes of the continuous-current commutator.

So soon as the apparatus is in motion and generates the continuous current the derivation, which includes the quarternary winding, is supplied with the current necessary for excitation.

In place of two distinct circuits in the armature—one for the alternating primary current, the other for the continuous secondary current—there may be only one circuit, which is traversed (simultaneously) by the alternating and the continuous current. To carry out this arrangement, account should be taken in planning the machine of the natural ratio of transformation which governs the voltages of the primary and secondary currents. This ratio, which is equal to $\frac{1}{\sqrt{2}}$, determines the voltage at the secondary terminals when that of the primary current has been given. To obtain, then, a continuous current of a specified voltage with the armature whose windings are united, it will suffice to feed it with a suitable primary current, which can easily be obtained by a transformer. If, on the other hand, the two circuits (primary and secondary) are separated, any ratio of transformation can be obtained in the same apparatus, said ratio depending simply upon the number of coils in the two windings respectively.

The apparatus of the present invention is believed to be the only one at present known which is able to effect industrially the conversion of a monophase alternating current into a continuous current in one machine without recourse to complicated and impracticable arrangements. In all other known installations for this purpose use is made only of synchronous motors driving continuous-current dynamos—that is to say, of two entirely distinct machines.

The new or improved converter can be started even when fed with a monophase current. For this it suffices, as theory and experience show, to effect an oblique connection between two sections of the armature at the moment of starting. This connection establishes a couple sufficient to move the armature. When the latter has attained the velocity of synchronism, the connection is broken and the apparatus continues its movement. Moreover, at the moment of starting, for increasing this couple, resistances can be introduced in the tertiary circuit as resistances have been introduced in a synchronous motor.

What we claim as new is—

1. A converter for the transformation wholly or partially of a monophase alternating current into a continuous current, or vice versa, comprising an armature carrying two windings, a primary winding fed by the alternating current to be transformed, and a secondary winding delivering the continuous current through a commutator, this armature being surrounded by a magnetic circuit formed by a fixed frame carrying a closed-coil tertiary winding set in the pole-pieces, the tertiary winding having for its object to transform the simple alternating field into a constant field fixed in space, substantially as described.

2. A converter for monophase alternating currents, comprising in combination an armature having a primary and a secondary winding, a closed or nearly closed magnetic frame surrounding said armature, a tertiary winding relatively stationary with reference to said magnetic frame, and a quarternary exciting-winding, substantially as described.

3. The described converter comprising a movable armature carrying two windings, one for the alternating current to be transformed and the other for the continuous current, and a magnetic frame surrounding said armature and carrying a tertiary winding composed of closed coils, and an exciter-winding for a continuous exciting-current connected in derivation with the brushes of the collector, as set forth.

4. The combination, in a rotary transformer, of a field-magnet, an armature, windings on said field-magnet and armature, connections from the field-magnet winding to a source of direct current, a commutator apparatus, and a pair of rings each connected to a winding on the armature, and a flux-screen in inductive relation to the armature, substantially as described.

In testimony whereof we affix our signatures in presence of two witnesses.

ANDRÉ BLONDEL.
GASTON SAUTTER.

Witnesses:
G. DE MESTRAL,
EDWARD P. MACLEAN.